United States Patent [19]

Przewalski

[11] 3,994,705

[45] Nov. 30, 1976

[54] GAS SCRUBBER WITH ADJUSTABLE CONVECTOR AND DEMISTING UNIT

[76] Inventor: Zygmunt J. Przewalski, 22 Brewster Road, Windsor, Conn. 06095

[22] Filed: May 27, 1975

[21] Appl. No.: 581,104

Related U.S. Application Data

[63] Continuation-in-part of Ser. No. 525,728, Nov. 21, 1974, abandoned.

[52] U.S. Cl. .................................. 55/226; 55/237; 55/239; 55/247; 55/249; 55/257 C; 55/257 NP; 55/267; 261/62; 261/119 R
[51] Int. Cl.$^2$.................... B01D 47/02; B01D 47/10
[58] Field of Search ............ 55/226, 236, 239, 249, 55/247, 255, 256, 257 MP, 257 HE, 267, 222, 237, 257 C; 261/62, 119 R, DIG. 54

[56] References Cited

UNITED STATES PATENTS

| | | | |
|---|---|---|---|
| 1,223,684 | 4/1917 | Fleming | 55/256 |
| 2,000,706 | 5/1935 | Lowther | 55/249 |
| 2,004,467 | 6/1935 | Hawley | 55/92 |
| 2,783,031 | 2/1957 | Vogt | 261/62 X |
| 3,307,335 | 3/1967 | Shomaker | 55/267 |
| 3,626,672 | 12/1971 | Burbidge | 55/267 X |
| 3,673,769 | 7/1972 | Gleason | 55/236 X |
| 3,750,375 | 8/1973 | Wintrell | 261/119 R X |
| 3,751,882 | 8/1973 | Phillips | 55/236 |
| 3,756,580 | 9/1973 | Dunn | 261/DIG. 54 X |

FOREIGN PATENTS OR APPLICATIONS

| | | | |
|---|---|---|---|
| 13,510 | 10/1907 | United Kingdom | 55/95 |

OTHER PUBLICATIONS

"Medusa Gas Scrubber," Bulletin M668, Krebs Engineers, Menlo Park, California, received in Group 5-11-72.

*Primary Examiner*—Frank W. Lutter
*Assistant Examiner*—Kathleen J. Prunner
*Attorney, Agent, or Firm*—Prutzman, Hayes, Kalb & Chilton

[57] ABSTRACT

The invention relates to an apparatus for agglomerating and precipitating suspended matter out of a gas using centrifugal acceleration within a treatment chamber distinguished by an inner cylindrical inlet tube through which the contaminated gas is led in a downward path and an outer circumscribing barrel through which the cleansed gas is led in a spiralling upward path. The inlet tube and barrel are mounted over and relative to a lower water filled reservoir or contaminant collection chamber. The gas exits from the inlet tube through an accelerator in the form of an adjustable venturi throat defined by a shroud arrangement vertically aligned with and spaced from the inlet tube and by which the downward flow direction of the gas is reversed as the gas aspirates water and passes upwardly through and out of the venturi throat and into the passageway defined by the inner inlet tube and the outer barrel. The upwardly moving gas is spirally deflected by means of spaced deflector plates outboard of and peripherally of the inlet tube and shroud so that a swirling motion is imparted thereto. The resultant force throws any heavy moist particles against an annular demisting collar which extends horizontally and radially outwardly into the path of the gas moving through the accelerator. The heavy mist impinging on the collar causes deflection thereby against the barrel wall whereby it is removed from the effluent and flows downwardly returnably to the water reservoir. The lighter mist-free gas bypasses the collar and moves in swirling fashion upwardly toward the clean gas outlet located within the upper part of the barrel, the gas picking up heat from the innermost inlet tube in its ascent and thereby assuring its mist-free condition upon reaching the gas outlet.

7 Claims, 4 Drawing Figures

GAS SCRUBBER WITH ADJUSTABLE CONVECTOR AND DEMISTING UNIT

RELATED APPLICATION

This application is a continuation in part of my copending application Ser. No. 525,728, filed Nov. 21, 1974, and now abandoned, the disclosure of which is incorporated by reference.

BACKGROUND AND SUMMARY OF THE INVENTION

The present invention relates generally to gas scrubbers of the venturi type and is more particularly concerned with a new and improved gas scrubber that incorporates an adjustable gas convector and demisting unit.

Today, more and more emphasis is being placed on the control of air pollution and the elimination of contaminants from the atmosphere. The air pollution problem is particularly acute in heavily industrialized and densely populated regions. For example, chemical and metal refining industries, foundries, metal manufacturing industries, and such, which have a large amount of waste gases either in the form of consumed gases or ventilating gases contribute extensively to air pollution. Unless these gases are treated adequately before being released into the atmosphere, humans may be subjected to dangerous and hazardous health conditions and the value of property, both personal and real, may be adversely affected.

As governmental agencies establish more rigid and stricter pollution standards for gases exhausted into the atmosphere, the need for more efficient, higher quality air pollution control devices has become acute and has led to the development of the invention herein described and claimed.

Gas scrubbers are a common means of removing gaseous and particulate pollutants from gases. A gas scrubber normally operates on the principle that a scrubbing liquid such as water sprayed into a stream of contaminated gas serves to wash the pollutants from the gas, the pollutants being carried away in the scrubbing liquid. However, during such scrubbing action, water droplets are entrained in the clean gas, and if allowed to remain therein, could be a source of contamination to the outside atmosphere because some of the pollutants being removed from the gas stream are carried in the droplets. Consequently, complex systems have been incorporated into scrubbers in order to reduce the entrainment of such droplets in the gas emitted from the scrubbers. In these systems the separated water is recirculated by means of pumps and piping back to the spray heads.

It has been suggested that gas scrubbers can eliminate pumps by driving the gas through or causes it to impinge upon a confined mass of water before passing through a venturi. This causes some breakdown or misting of the entrained water droplets. However, in these systems, the fine mist disadvantageously flows through the system and causes substantially the same contamination problems as with other systems unless appropriate filters are utilized.

It is the desideratum of this invention not only to eliminate the need for pumps and/or water sprays but also to provide automatic demisting coupled with adjustable control over the pressure differentials within the system.

An object of the present invention is to provide a new and improved venturi-type gas scrubber that includes simple adjustable control over the venturi throat opening and reliable self-contained demisting while obviating the need for pumps, nozzles, filters, spray chambers, piping and the like as well as the maintenance problems associated therewith.

Another object of the present invention is to provide a gas scrubber of the type described that is of compact economical design and well suited to simple, low maintenance requirements.

Still another object is to provide a gas scrubber that provides not only for impingement of the gas on a confined cleaning fluid and subsequent passage through a venturi passage but also for a static zone and a demisting unit operatively associated with the venturi passage for deflecting the heavy mist toward and into the static zone while permitting the clean gas to bypass the static zone.

A further object of the present invention is to provide a venturi-type scrubber of the type described that incorporates pumpless fluid injection into the venturi passage without the need for nozzles, piping and the like.

Other objects will be in part obvious and in part pointed out more in detail hereinafter.

These and related objects are accomplished in accordance with the present invention by providing a venturi gas scrubber comprising a liquid storage tank for holding a quantity of gas cleaning liquid and an elongated tower member having an open bottom end supported within the tank and immersed within the liquid. The tower has a gas outlet port adjacent the top thereof and a gas inlet tube extending centrally along the interior of the tower toward the gas cleaning liquid and adjustably mounts a gas convector and demisting unit. The unit includes a gas directing sleeve portion having a gas outlet end adjacent the surface of the liquid within the tank, an independently adjustable tubular venturi shroud partially immersed within the liquid and fully encircling the gas outlet end to provide an adjustable venturi constriction therebetween and a demisting flange circumscribing the sleeve intermediate the gas inlet tube and the constriction and extending outwardly from the tube well above the surface of the liquid but within the flow stream of the venturi constriction. In this way the liquid droplets accelerated through the constriction impinge on the flange and are deflected back toward the liquid within the bottom end of the tower while the gas travels toward the gas outlet port of the tower.

A better understanding of the invention will be obtained from the following detailed description and the accompanying drawings of an illustrative application of the invention.

DESCRIPTION OF THE PREFERRED EMBODIMENTS

Figure 1:
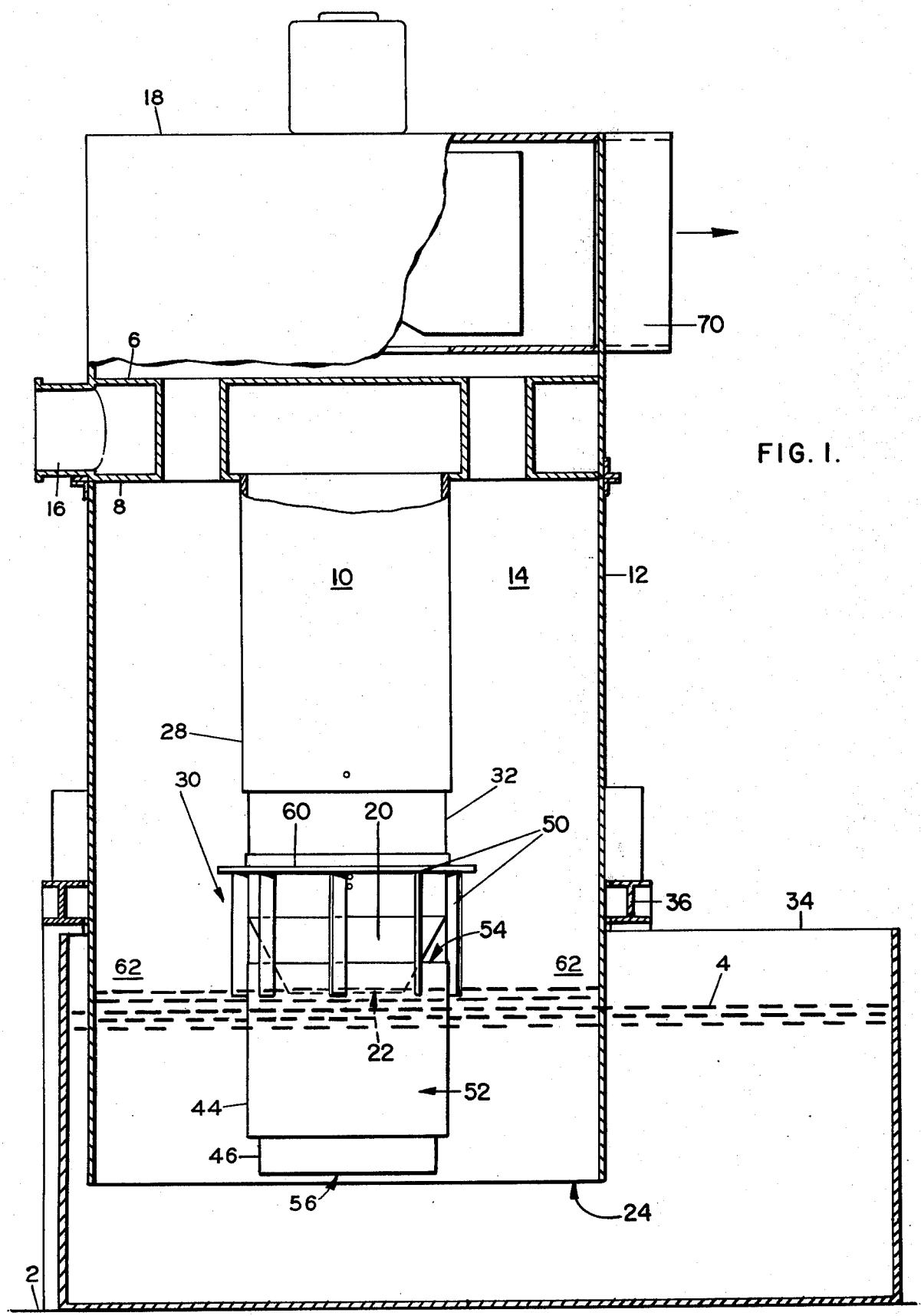
FIG. 1 is a front elevational view, partially in section, of a scrubber embodying the invention.
Figure 2:
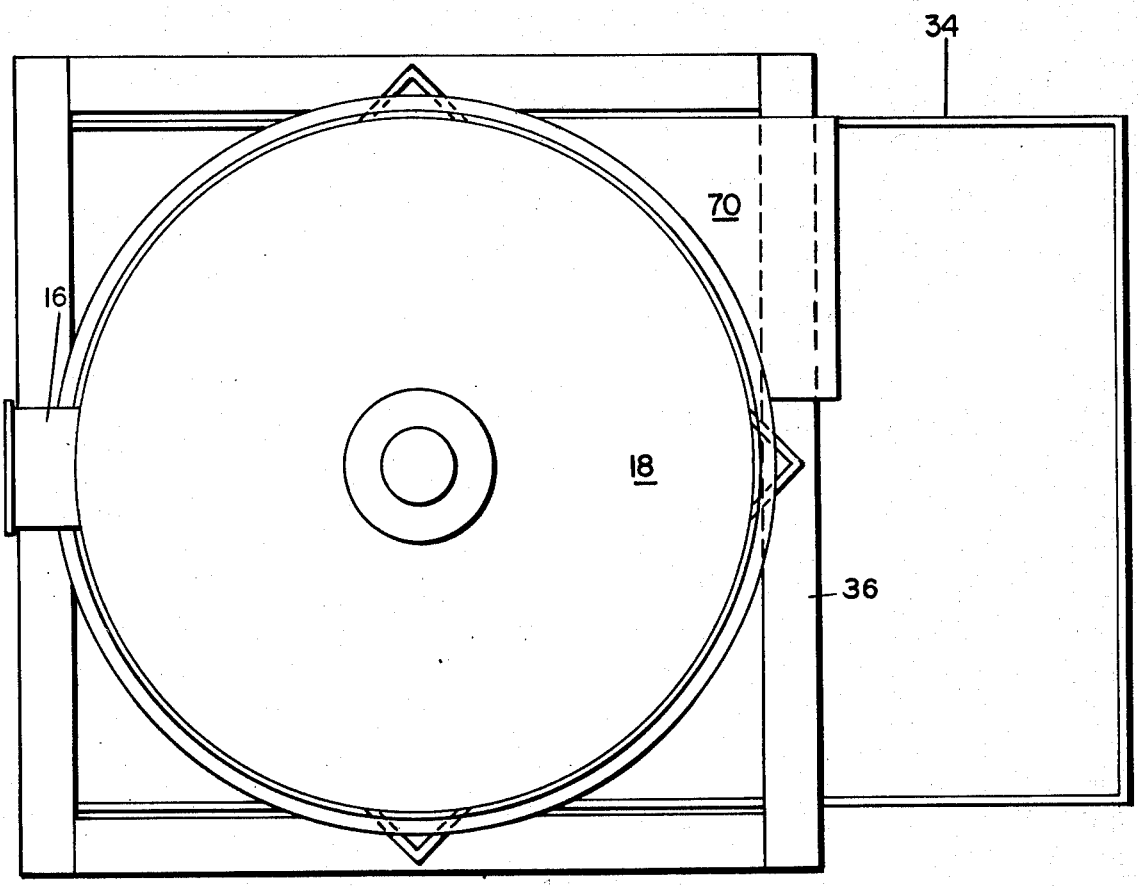
FIG. 2 is a top plan view thereof.
Figure 3:
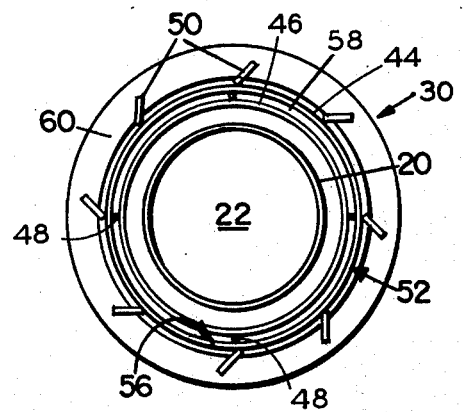
FIG. 3 is a bottom plan view of the gas inlet tube and shroud showing the radial disposition of the deflector plates.

Referring now to the drawings in greater detail wherein like reference numerals indicate like parts throughout the several figures, the gas scrubber of the present invention is shown as including a vertically disposed generally cylindrical main body member or tower 12 of tubular configuration that is firmly and fixedly supported in an elevated position above a supporting base 2 by means of a suitable frame or housing 36. An open bottom end 24 of the main body member 12 is positioned within a reservoir or settling tank 34 resting on the base 2 and extends into the tank a sufficient distance to position the end 24 well below the water level 4 within the tank. A disc-shaped heat exchange unit 6 rests on and encloses the top end 8 of the tower 12 and is provided with a peripheral gas inlet port 16 for receiving the gas entering the scrubber. A gas inlet tube 10 in communication with the inlet port 16 depends from the heat exchanger 6 and projects coaxially downwardly through the center of the cylindrical tower 12 terminating in an open end portion 28 at about the mid-point thereof. Telescopically mounted on the gas inlet tube 10 at the bottom open end 28 thereof is an adjustable gas convector and demisting mechanism, designated generally by the numeral 30, which extends downwardly therefrom terminating at approximately the same level as the innermost end of the cylindrical barrel 12.

As shown, the barrel 12 is of substantially greater diameter than the inlet tube 10 and gas convector unit 30 such that a hollow circular flow cavity or chamber 14 is defined therebetween. The cavity 14, in turn, communicates through the heat exchanger 6 with an exhaust fan unit 18 mounted above the heat exchanger and with a tangential gas outlet port 70 therein. Thus, as will be appreciated, hot contaminated gases which may have temperatures in the vicinity of 1200°-1500° F will enter the scrubber unit through the gas inlet port 16 and, after passing through the heat exchanger 6, will descend through the gas inlet tube 10 and convector unit 30 in such a fashion that the gases are directed against the water or other cleansing liquid contained within the settling tank 34. After impingement on the liquid the gas will flow upwardly through the chamber 14 toward the heat exchanger 6 and therethrough to the exit port 70 in response to the impelling force of the exhaust fan unit 18.

Figure 4:
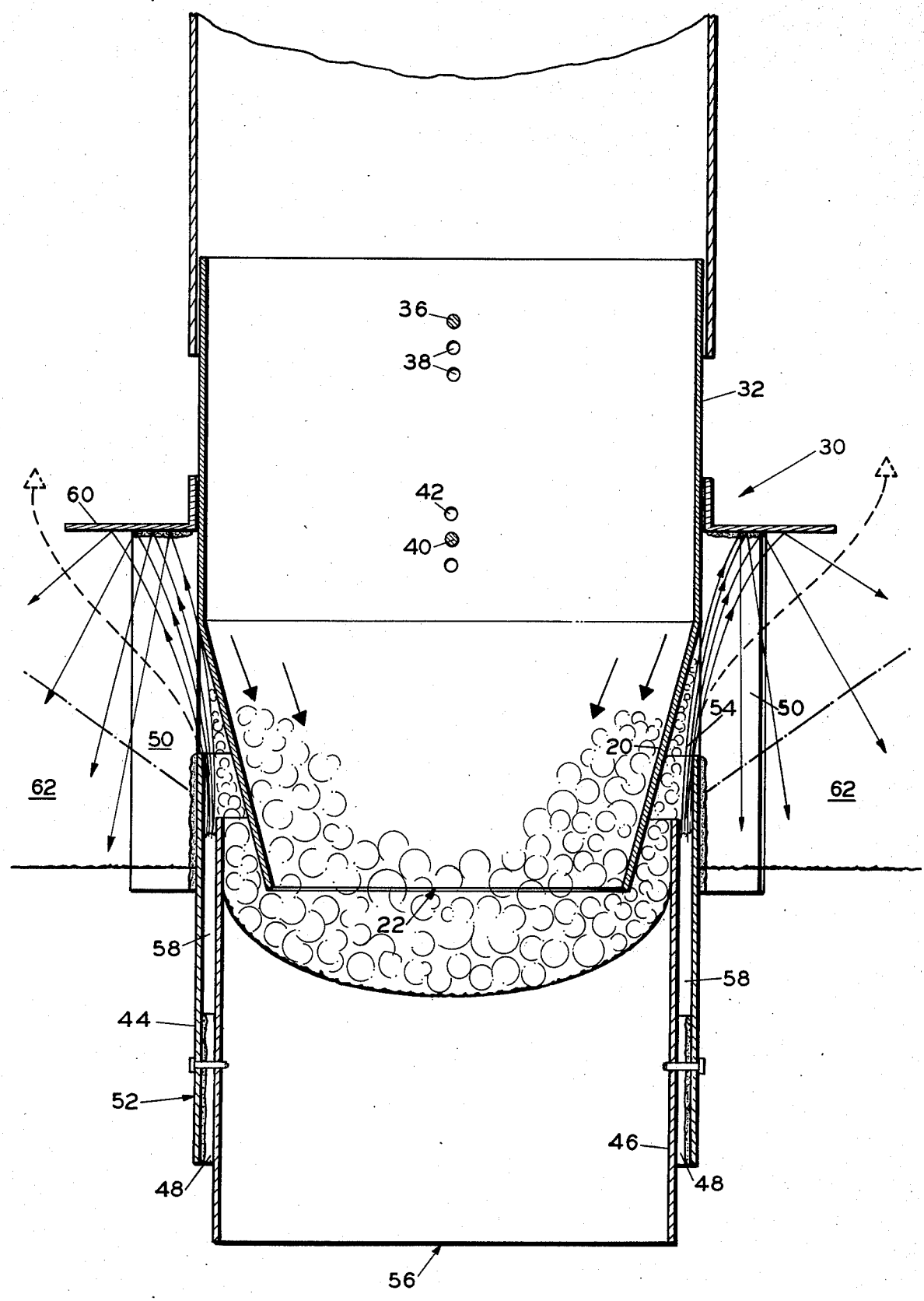
FIG. 4 is an enlarged sectional view of the gas inlet tube and shroud.

In accordance with the present invention and as best shown in FIGS. 1 and 4, the gas convector and demisting unit 30 of the gas scrubber includes a tubular inlet sleeve portion 32 that is telescopically received within and adjustably positioned relative to the cylindrical gas inlet tube 10. The tubular sleeve is provided with a conical lower end portion 20 having a constricted opening 22 positioned at or slightly above or below the water level 4 in the reservoir. The sleeve portion 32 is shown in FIG. 4 as provided with a series of longitudinally spaced apertures 38 which cooperate with a pin 36 carried by tube 10 to interconnect sleeve portion 32 with the inlet tube. As will be appreciated, the telescopic interconnection between the gas inlet tube 10 and the tubular sleeve portion 32 of the gas convector 30 will permit position adjustment of the conical end portion 20 so as to correctly position the opening 22 thereof with respect to the level of the water.

The gas convector 30 additionally is provided with an adjustably positioned dual shroud 52 of generally cylindrical configuration that encloses the conical lower end 20 of the tubular sleeve 32 and extends downwardly therefrom into the cleansing liquid within the settling tank 34. The dual shroud is fixedly connected to a flat flange-like deflector ring or collar 60 that is adjustably mounted on the tubular sleeve 32, such as by the pin 40 positioned in one of the longitudinally spaced apertures 42 in sleeve portion 32, the pin 40 supportably engaging the collar 60 for axial adjustment relative to the sleeve. The dual shroud 52 is connected to the radially extending collar 60 by means of a plurality of circumferentially spaced deflector fins 50 that are angularly oriented relative to both the collar 60 and the dual shroud 52 and maintain an appropriate precalculated spacing therebetween. Thus, the dual shroud 52 and demisting collar 60 can be moved axially as a unit along the tubular sleeve portion 32 of the gas convector 30 but its travel is limited since the coaxial shroud has an outer diameter approximately equal to that of the tubular sleeve portion. Movement in an upward vertical direction tends to close the gap or adjustable orifice 54 defined by the shroud and the tapered conical end portion of the sleeve while lowering the unit tends to open the gap or throat portion defined by those members.

As best shown in FIG. 4, the dual shroud consists of a pair of concentric tubular members 44 and 46, respectively, fixedly positioned in spaced relationship, as by a plurality of spaced plates 48, so as to define a narrow circular cavity 58 therebetween. The dual shrouds 44 and 46 are of substantially the same axial length but are offset or axially displaced relative to each other so that the inner shroud 46 extends below the outer shroud 44, the offset being comparable to the taper provided in the conical end 20 of the tubular sleeve member. As shown, both shrouds normally extend into the water contained within the settling tank thereby effectively closing the bottom end 56 thereof relative to as passage therethrough. The upper ends of both shrouds are positioned vertically above the opening 22 in the conical end portion 20 and, as mentioned, cooperate therewith to provide a constriction or adjustable orifice 54 through which the gas passes after exiting from the gas inlet sleeve and impinging on the water within the settling tank.

As will be appreciated, the inner shroud provides a confined mass of water against which the gases directly impinge so that the heavier, larger contaminant particles within the hot gas stream will tend to be retained within the water. The tapered or conical end portion 20 of the tubular sleeve 32 tends to constrict, consolidate and accelerate the gases immediately prior to impingement upon the confined mass of water and cause the water to be displaced slightly. As illustrated in FIG. 4, the force of the hot gases causes the water in the remainder of the settling tank and therefore within the main body member 12 to rise to a slightly higher level. The impingement of the gas on the confined mass of water within shroud 46 also tends to create a turbulent condition within the confined space and the gas, together with any water entrained therein, will reverse direction and flow toward the constricted adjustable orifice under the pressure flow conditions created by the exhaust fan 18.

As the gases pass through the adjustable orifice, they have an aspirating or suction effect on the water located within the narrow circular ring 58 provided between the interior and exterior shrouds 46 and 44 respectively. Thus a water spray is automatically injected into the adjustable orifice from the ring 58 and is carried by the accelerated force of the gas toward the annular deflector collar 60 positioned slightly above the throat of the venturi. The momentum imparted to the heavier particles of mist and contaminant impel these particles towards and against the demisting flange 60 as indicated by the arrows while the lighter gas components tend to bypass the flange and spirally ascend toward the heat exchanger 6. The water droplets and contaminants forced against the deflector flange 60 will rebound downwardly toward a static air space 62 located above the surface of the water outwardly of the top edge of the dual shroud 52. Depending on the angle at which the particles rebound from the deflector flange, they will be directed back toward the static area 62 immediately or toward the side walls of the barrel 12 and then downwardly into the static zone 62 where they will fall back into the water tank and not be entrained in the gas flowing toward the heat exchanger.

Since the gas entering the scrubber is conventionally at a very high temperature, for example, at about 1200°–1500° F, it will be cooled as it passes through the heat exchanger 6 and may have a temperature of about 400° F as it passes vertically downwardly along the gas inlet tube 10. If desired, further cooling of the incoming gas can be effected by water introduced, preferably in a tangential manner, within the inlet tube above the convector unit. Additional cooling results during impingement of the gases on the confined water within the dual shroud 52. The gases are constricted by conical section 20 just prior to striking the water thereby forming a turbulent mist that passes outwardly toward the adjustable orifice 54 and demisting collar 60. Through adjustment of the position of the dual shroud 52 additional water is injected into the gas stream for cleansing and cooling and the pressure conditions at the venturi throat are controlled. The gas is immediately demisted by the flange 60 and a spiral flow is imparted thereto by the deflector fins 50. At this point, the gas may have a temperature of only about 200° F and, of course, contains water in gaseous form. At this gas ascends along the hot gas inlet tube 10 and through the heat exchanger 6, it is again reheated through heat exchange with the hot inlet gases so that by the time it reaches the exhaust fan 18 and tangentially arranged exhaust port 70 of the scrubber it may have reached an elevated temperature of above 400°–450° F.

As will be appreciated, additional chemical or mechanical decontaminating means may be included within the system of the present invention, although the exact location of such a decontaminating unit will vary with the particular system to which it is applied.

Thus, as will be appreciated from the foregoing description, the gases to be cleaned will enter the scrubber through the gas inlet port 16 and flow downwardly in a direct manner through the gas inlet tube 10 and telescoping sleeve 32 so that they impinge upon the cleaning liquid within the settling tank 34. The contaminated gases passing through the sleeve 32 are accelerated by the tapered conical end 20 thereof and exit therefrom in converging fashion into the confines of the innermost shroud 46 where their direction is essentially reversed causing substantial turbulence and mist. The position of the sleeve 32 relative to the surface of the water can be adjustably controlled to thereby control the pressure, turbulence and misting generated. This turbulent initial impingement of the gases on the cleansing water tends to remove the coarse dirt which then settles to the bottom of the tank. The gas, finer contaminants and mist generated within the turbulent initial impact area pass through the adjustable orifice 54 causing an additional cleansing aspiration effect by drawing water from the narrow area 58 between the dual shrouds and projecting the gas and water mixture toward and against both the deflector plates or fins 50 and the radially extending demisting flange 60. This operation is independently adjusted by movement of the flange 60 to open or close the adjustable orifice 54 and, if desired, eliminate the aspirated liquid flow into the throat area. The deflector fins 50 tend to impart a centrifugal force to the gas stream leaving the venturi assisting in the bypass of the gas around the demisting flange 60 while the heavier more accelerated particles impinges on the flange and are rebounded into the static zone 62 adjacent the surface of the water outside the outermost shroud 44 of the gas convector unit 30. Substantially all of the liquid droplets and aspirated water entrained therein as well as the contaminating solids are deflected downwardly where under the influences of the gravity, they settle to the bottom of the settling tank.

As will be apparent to persons skilled in the art, various modifications, adaptations and variations of the foregoing specific disclosure can be made without departing from the teachings of the present invention.

I claim:

1. In a venturi gas scrubber suited for cleaning hot contaminated gases, the combination comprising a liquid storage tank, a quantity of gas cleaning liquid within said tank, an elongated tower member having an open bottom end supported within the tank and immersed within the liquid, said tower having a gas outlet port adjacent the top thereof, a gas inlet tube extending centrally along the interior of said tower toward said gas cleaning liquid; a gas convector and demisting unit mounted on said gas inlet tube, adjustment means for adjustable axial positioning of the unit relative to said tube, said convector and demisting unit being partially immersed within the liquid and including a gas directing sleeve portion having an inlet end connected to the gas inlet tube by said adjustment means in flow communication with the gas inlet tube and a gas outlet end adjacent the surface of the liquid within the tank, an independent shroud partially immersed within said liquid and fully encircling said gas outlet end, said shroud being axially adjustable relative to said sleeve portion and spaced therefrom to provide an orifice of adjustable size therebetween and a continuous ring-like demisting collar fixedly connected to said shroud above said shroud and orifice for movement with said shroud, second adjustment means adjustably mounting said shroud and collar on said sleeve, said collar circumscribing said sleeve intermediate said gas inlet tube and said orifice and extending outwardly from said tube well above the surface of said liquid and within the flow stream of said orifice whereby liquid droplets accelerated through said orifice impinge on said collar and are deflected back toward the liquid within said bottom end of said tower while the gas travels toward the gas outlet port of said tower.

2. The gas scrubber of claim 1 wherein the gas outlet end of said sleeve portion includes a conical configuration whereby the gas is constricted and accelerated immediately prior to impingement on the cleaning liquid.

3. The gas scrubber of claim 1 including a fan unit adjacent said gas outlet port for impelling the gas through the scrubber.

4. The gas scrubber of claim 1 including a plurality of spaced deflector fins interconnecting said shroud and said collar and being oriented to impart a rotational flow component to the gas flowing from said orifice.

5. The gas scrubber of claim 1 including a heat exchanger operatively connected with said gas inlet tube and adjacent the outlet port of said tower to provide an indirect heat exchange function between the incoming and exhaust gases.

6. In a venturi gas scrubber suited for cleaning hot contaminated gases, the combination comprising a liquid storage tank, a quantity of gas cleaning liquid within said tank, an elongated tower member having an open bottom end supported within the tank and immersed within the liquid, said tower having a gas outlet port adjacent the top thereof, a gas inlet tube extending centrally along the interior of said tower toward said gas cleaning liquid; a gas convector and demisting unit mounted on said gas inlet tube, adjustment means for axially adjusting the unit relative to said tube, said convector and demisting unit being partially immersed within the liquid and including a gas directing sleeve portion having an inlet end connected to the gas inlet tube by said adjustment means and in flow communication with the gas inlet tube and a gas outlet end adjacent the surface of the liquid within the tank, an independent shroud partially immersed within said liquid and fully encircling said gas outlet end, said shroud being spaced from said sleeve portion to provide an orifice therebetween and including a pair of concentric cylindrical shroud members defining a narrow annular space therebetween communicating with said gas cleaning liquid, said gas outlet end and said shroud members converging to define said orifice therebetween and promote aspiration of said liquid through said narrow annular space into said orifice, second adjustment means adjustably mounting said shroud on said sleeve, said shroud being axially movable relative to said sleeve portion to adjust the size of said orifice, said convector and demisting unit including means positioned to intercept said aspirated liquid-gas flow as it emerges from said orifice so as to rebound downwardly the liquid droplets and contaminants.

7. The gas scrubber of claim 6 wherein said shroud members are concentric and coaxially aligned with said sleeve portion, said members being axially offset relative to each other at said orifice.

* * * * *